Aug. 27, 1963     R. DZIALLAS ETAL     3,101,925
DRILLING TURBINE
Filed Jan. 14, 1960
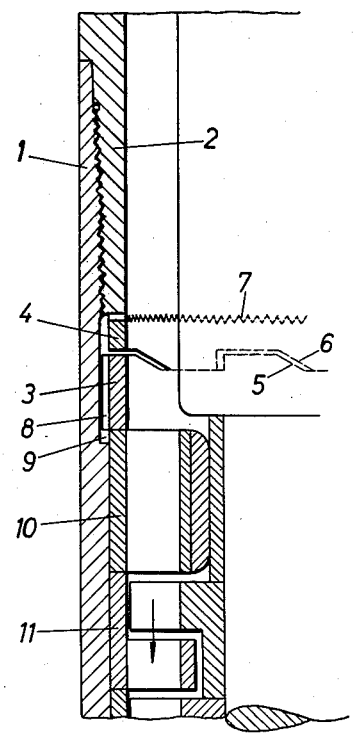
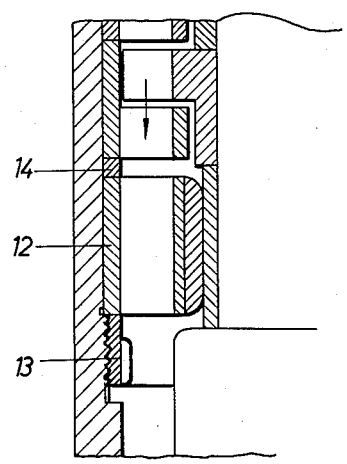
INVENTOR.
Richard Dziallas
Karl Kaufmann
Karl Biottendieck
BY
Walter Becker
Patent Agent United States Patent Office 3,101,925
Patented Aug. 27, 1963

3,101,925
DRILLING TURBINE
Richard Dziallas and Karl Kaufmann, Heidenheim, and Carl Biedendieck, Bentheim, Reg. Bez. Osnabruck, Germany, assignors to J. M. Voith G.m.b.H., Heidenheim, Germany
Filed Jan. 14, 1960, Ser. No. 2,404
Claims priority, application Germany Jan. 17, 1959
6 Claims. (Cl. 253—3)

The present invention relates to turbines and, more particularly, to drilling turbines.

Recently more and more hydraulic drilling turbines are employed for deep drilling. These drilling turbines are arranged at the lower end of the drilling bars directly above the drill bit. Such drilling turbines consist primarily of a tubular housing suspended on the rod system and having guide vane rings fastened therein, and of a rotatable member (runner) supporting said guide wheel blade rings. Said rotatable member is journalled in said tubular housing by means of thrust bearings and radial bearings and drives the drill bit. Scavenging liquid is employed as actuating fluid for the turbine. Said scavenging liquid is subjected to pressure by a pump mounted on the surface of the ground, generally a piston pump. The scavenging fluid also serves for cooling the drilling tools as well as for washing out the drilling dust. The weight of the rotating parts and the difference between the considerable hydraulic axial thrust and the oppositely directed mechanical drilling thrust is absorbed by the abovementioned thrust bearing.

Recently, drilling turbines are frequently designed as so-called section turbines, i.e. the drilling turbines are, in longitudinal direction thereof, sub-divided into a plurality of sections interconnected by threaded connections. With the heretofore known drilling turbines of this type, the lowermost section usually has approximately from 80 to 100 steps. At ordinary operation, the torque of the stators is sufficient to balance the frictional torque in the bearing so that the connection between the individual sections will not screw loose particularly inasmuch as the sections are connected to each other not only by the fact that they are threaded to each other but also by friction. At the maximum frictional torque, for instance when the vertical bearing jams, the said sectional turbines will screw loose. If the coupling of the runner shaft is properly designed, the just mentioned loosening of the sections will not bring about a loss of the lower section because with a properly designed coupling of the runner shaft, the axial longitudinal displacement of the tubular housing will, when said connection is screwed loose, interrupt the torque transmission from the upper section to the lower section so that the hydraulic torque in the lower section will then again bring about a closing of the outer mantle or housing connection. This alternate loosening and again fastening of the connection will, however, repeat itself until the torque resulting from the bearing friction exceeds the hydraulic torque of the guide vane groups in the lower section. This situation results in a decrease of the output of the drilling turbine and in a gradual destruction of the connection between the shaft portions. If, however, a gear clutch is employed for connecting the shaft portions, the result will be a complete unscrewing of the interconnected section and thereby the loss of the lower section if the length of engagement of the gear or jaw clutch exceeds the threaded connection of the thread which may, for instance, be conical.

It is, therefore, an object of the present invention to provide a drilling turbine which will overcome the above mentioned drawbacks.

It is another object of this invention to provide a drilling turbine composed of a plurality of sections, which will make it possible to transport the individual sections in completely assembled form to the drilling field, which means that the axial play between the runner steps and guide wheel steps can be finally fixed before the turbine is transported to the drilling field where no further adjustment will be required.

It is still another object of this invention to provide a two-part drilling turbine which will make it possible even after repeated disconnection and reconnection of the said two parts or sections to assure a play-free connection of said two parts in any position thereof.

These and other objects and advantages of the invention will appear more clearly from the following specification in connection with the accompanying drawing which illustrates a longitudinal section through the locking connection of two sections.

The drilling turbine according to the invention especially adapted for driving drilling tools for deep drilling operations, which comprises at least two sections the housings of which are interconnected by threaded sleeves, i.e. in a friction locked manner and not positively, is characterized in that the threaded connections of said sections are provided with a locking system arranged between the housings to hold these housings against relative rotation. According to the invention said locking system is arranged within the tubular housing of the sections and comprises a first ring non-rotatably abutting one housing and a second ring axially slidable in the other housing but held against rotation thereon, said rings having interengageable cam surfaces on their adjacent faces. Moreover this locking system comprises means carried by the other housing and adjustable for moving said rings toward and away from each other to lock the housings together or to release the housings.

According to a further development of the invention, the two rings are so designed, that they engage each other by means of cam surfaces the inclination of which exceeds the inclination of the screw thread of the section ends. The occurrence of a torque loosening the threaded connection and a slight turning of the two interengaged parts with regard to each other cause the cam surfaces to press said parts apart to thereby increase the friction in the thread.

According to a still further development of the invention, the cam surfaces are respectively arranged on rings of which one ring has serrations on that side thereof which is located opposite said cam surfaces and by means of said serrations engages correspondingly shaped serrations of the section end pertaining thereto, whereas the other ring engages by circumferential splines or keys correspondingly shaped axial grooves at the section end pertaining thereto and is thus secured against rotation relative thereto. Also, in this instance, the arrangement has to be designed so that the arresting of one ring relative to the adjacent section end will occur only when the abutting sections are screwed to each other. This may be effected by inserting one of the two rings with play in axial direction while selecting said play so that the serrations or the like securing the other ring with regard to the section end faced thereby will be adapted to become disengaged when tightening the sections. After said tightening, the play will be eliminated by tightening of a threaded ring or the like. According to a further possibility, one ring may be arrested in axial direction but will be arrested in the direction of rotation only later for instance by inserting a threaded arresting pin from the outside.

This way of securing the two sections relative to each other by means of two rejecting jaw rings one of which meshes by serrations with the section end associated therewith, will assure that also after repeated loosening of the sections and connection thereof, a play-free arresting of the two parts relative to each other in any position thereof will be maintained. When a loosening torque occurs, one ring will, through the intervention of the serrations, rest against one section end, whereas the other ring through the intervention of the wedge members will rest against the other section end, and one ring will rest through the rejecting surfaces against the other ring whereby a loosening of the sections will be prevented. The inclined surfaces additionally bring about that the serrations will be held in meshing engagement with each other under increased force. The increase in the frictional effect in the thread of the sections through the rejecting jaws represents an additional safety feature.

Referring now to the drawing in detail, the locking system is arranged completely within the mantle pipe. Between the sleeve section 1 and the stud section 2 there are inserted two rings 3 and 4 which engage each other by means of rejecting jaws 5, 6. The opposite side of ring 4 is provided with fine teeth 7 engaging correspondingly shaped teeth at the end of the stud or pilot section 2. The circumference of the other ring 3 is provided with splines 8 by means of which it engages corresponding grooves 9 of the sleeve section 7 in an axially displaceable manner. Ring 3 rests against a ring 70 which latter is followed by spacer bushings 77 of the guide wheel stages. Between the last bushing 77 and the last ring 72 of this section which ring pertains to a radial bearing, a distance ring 74 and following said last ring 72 a threaded ring 73 is inserted into the tubular mantle section. This ring 73 is tightened only after the two sections have been firmly screwed into each other. Prior to that, the said threaded ring 73 leaves sufficient play for holding the teeth 7 disengaged so that it will be possible to screw the said two sections into each other.

After the sections have been screwed into each other and the threaded ring 73 has been tightened, it will be evident that when a loosening torque and a slight relative movement occurs between the two sections, the two rejecting jaw rings will be pressed apart by means of their jaws. As a result thereof, the fine teeth 7 will be firmly held in meshing engagement with each other so that the two section ends screwed into each other will rest against each other by means of the grooves 9 and splines 8, the inclined surfaces 5 and 6 of the rejecting jaws, and the fine teeth 7. Additionally, the friction in the conical thread between the sleeve section and the stud section will be increased.

For purposes of separating the two sections from each other, it is first necessary to loosen the threaded ring 73.

It is, of course, to be understood that the present invention is, by no means, limited to the particular constructions shown in the drawings but also comprises any modifications within the scope of the appended claims.

What we claim is:

1. A drilling turbine especially adapted for driving drilling tools for deep drilling operations, said drilling turbine comprising at least two sections, each section having a housing, said housings being connected by interengaging threaded portions thereon, ring means between said housings operable to hold the housings against relative rotation, said ring means comprising a first ring non-rotatably abutting one housing and a second ring axially slidable in the other housing but held against rotation thereon, said rings having interengageable cam surfaces on their adjacent faces, and means carried by the other housing and adjustable for moving said rings toward and away from each other to lock the housings together or to release the housings.

2. A drilling turbine especially adapted for driving drilling tools for deep drilling operations, said drilling turbine comprising at least two sections, each section having a housing, said housings being connected by interengaging threaded portions thereon, ring means between said housings operable to hold the housings against relative rotation, said ring means comprising a first ring non-rotatably abutting one housing and a second ring axially slidable in the other housing but held against rotation thereon, said rings having interengageable cam surfaces on their adjacent faces, and means carried by the other housing and adjustable for moving said rings toward and away from each other to lock the housings together or to release the housings, said cam surfaces comprising mating inclines on said rings of a greater pitch than that of the threads on said housings.

3. A drilling turbine especially adapted for driving drilling tools for deep drilling operations comprising two sections, each section having a housing, one housing having a threaded recess in the end and the other housing having a threaded pilot engaging the threaded recess for screw threadedly interconnecting the housings, rings in said recess disposed between the bottom of the recess and the end of the pilot when the housings are screwed together, said pilot having means on the end non-rotatively engaging one ring when in abutting engagement therewith, the other ring being axially slidable in said recess and held against rotation therein, said rings having mating cam surfaces on their adjacent faces having a greater pitch than the pitch of the threads on the pilot and recess, and means accessible from the end of the housing having the recess opposite the recess for forcing said other ring into operative engagement with said one ring and said one ring into engagement with the end of said pilot.

4. A drilling turbine especially adapted for driving drilling tools for deep drilling operations comprising two sections, each section having a housing, one housing having a threaded recess in the end and the other housing having a threaded pilot engaging the threaded recess for screw threadedly interconnecting the housings, rings in said recess disposed between the bottom of the recess and the end of the pilot when the housings are screwed together, said pilot having means on the end non-rotatively engaging one ring when in abutting engagement therewith, the other ring being axially slidable in said recess and held against rotation therein, said rings having mating cam surfaces on their adjacent faces having a greater pitch than the pitch of the threads on the pilot and recess, and means accessible from the end of the housing having the recess opposite the recess for forcing said other ring into operative engagement with said one ring and said one ring into engagement with the end of said pilot, said last mentioned means comprising a nut threaded into the end of the housing.

5. A drilling turbine especially adapted for driving drilling tools for deep drilling operations comprising two sections, each section having a housing, one housing having a threaded recess in the end and the other housing having a threaded pilot engaging the threaded recess for screw threadedly interconnecting the housings, rings in said recess disposed between the bottom of the recess and the end of the pilot when the housings are screwed together, the end of said pilot and the adjacent side of the one ring adjacent the end of the pilot having serrations engageable to lock the one ring to the pilot against relative rotation, the other ring having means engaging the said other housing for non-rotative axial movement of the other ring in the said other housing, said rings on their adjacent faces comprising axially projecting interengageable portions having inclined mating surfaces with a pitch greater than the pitch of the threads on the pilot and recess, said other ring being engaged on the side opposite said one ring by the turbine parts in said other housing, and a nut threaded in the end of said other housing remote from the threaded recess therein also engaging said turbine parts and adjustable for moving the turbine parts and other ring axially in said other housing toward said one ring to bring said serrations on the one ring and pilot together and to bring said inclined mating surfaces on the rings into operative relation thereby to lock the housing, together against relative rotation.

6. A drilling turbine especially adapted for driving drilling tools for deep drilling operations comprising two sections, each section having a housing, one housing having a threaded recess in the end and the other housing having a threaded pilot engaging the threaded recess for screw threadedly interconnecting the housings, rings in said recess disposed between the bottom of the recess and the end of the pilot when the housings are screwed together, the end of said pilot and the adjacent side of the one ring adjacent the end of the pilot having means engageable in a plurality of rotated positions of said pilot and one ring upon axial movement of the one ring toward the pilot to provide for non rotative interconnection of the pilot and one ring in a plurality of different positions, the other ring having means engaging the said other housing for non-rotative axial movement of the other ring in the said other housing, said rings on their adjacent faces comprising axially projecting interengageable portions having inclined mating surfaces with a pitch greater than the pitch of the threads on the pilot and recess, said other ring being engaged on the side opposite said one ring by the turbine parts in said other housing, and a nut threaded in the end of said other housing remote from the threaded recess therein also engaging said turbine parts and adjustable for moving the turbine parts and other ring axially in said other housing toward said one ring to bring the said means on the pilot and one ring into operative engagement and to bring said inclined mating surfaces on the rings into operative relation thereby to lock the housings together against relative rotation.

References Cited in the file of this patent

UNITED STATES PATENTS

| | | |
|---|---|---|
| 1,769,381 | Montgomery | July 1, 1930 |
| 2,155,640 | Bruce | Apr. 25, 1939 |
| 2,318,590 | Boynton | May 11, 1943 |
| 2,422,223 | Church | June 17, 1947 |
| 2,436,506 | Edwards | Feb. 24, 1948 |
| 2,726,606 | Davidson | Dec. 13, 1955 |
| 2,728,546 | De Giers | Dec. 27, 1955 |
| 2,797,109 | Conrad | June 25, 1957 |
| 2,845,106 | Baker | July 29, 1958 |
| 2,864,629 | Hall | Dec. 16, 1958 |
| 2,925,955 | Carroll | Feb. 23, 1960 |

FOREIGN PATENTS

| | | |
|---|---|---|
| 709,213 | Germany | Aug. 9, 1941 |